United States Patent

Gunesin et al.

[11] Patent Number: 5,602,206
[45] Date of Patent: Feb. 11, 1997

[54] BLOCK COPOLYMER PROCESS

[75] Inventors: Binnur Z. Gunesin, New York, N.Y.; Patricia J. Nelson, Franklin Township, N.Y.

[73] Assignee: BASF Corporation, Mt. Olive, N.J.

[21] Appl. No.: 845,569

[22] Filed: Mar. 4, 1992

[51] Int. Cl.$^6$ .................... C08F 293/00; C08F 27/00
[52] U.S. Cl. .................... 525/314; 525/313; 525/315; 525/316
[58] Field of Search .................... 428/407; 525/271, 525/314, 313, 315, 316

[56] References Cited

U.S. PATENT DOCUMENTS

| Re. 27,145 | 6/1971 | Jones | 260/880 |
|---|---|---|---|
| 3,770,712 | 11/1973 | Schwab | 260/93.5 |
| 4,835,220 | 5/1989 | Bronstert et al. | 525/250 |
| 4,871,814 | 10/1989 | Gunesin et al. | 525/314 |
| 4,891,410 | 1/1990 | Bronstert et al. | 525/314 |
| 4,985,505 | 1/1991 | Gunesin et al. | 525/250 |
| 5,082,732 | 1/1992 | Ueda et al. | 428/407 |

Primary Examiner—W. Robinson H. Clark
Attorney, Agent, or Firm—Dennis V. Carmen

[57] ABSTRACT

An anionic dispersion polymerization process is described for preparing linear block copolymers containing an odd number of blocks including blocks of polymerized styrenic compound, e.g., styrene, (A blocks) which are the end or terminal blocks of the polymer and which alternate along the polymer chain with elastomeric blocks of polymerized conjugated diene units (B blocks). The process includes initially contacting the total amount of styrenic compound to be utilized in forming the block copolymer under polymerization conditions with an anionic initiator and dispersant in an inert dispersion medium in which the polymer is insoluble and carrying out the process in stages wherein less than the total amount of styrenic compound is allowed to polymerize, alternating with stages wherein amounts of diene are added and allowed to polymerize completely. The addition of diene interrupts the polymerization of styrenic compound due to the greater tendency of diene to polymerize.

7 Claims, 1 Drawing Sheet

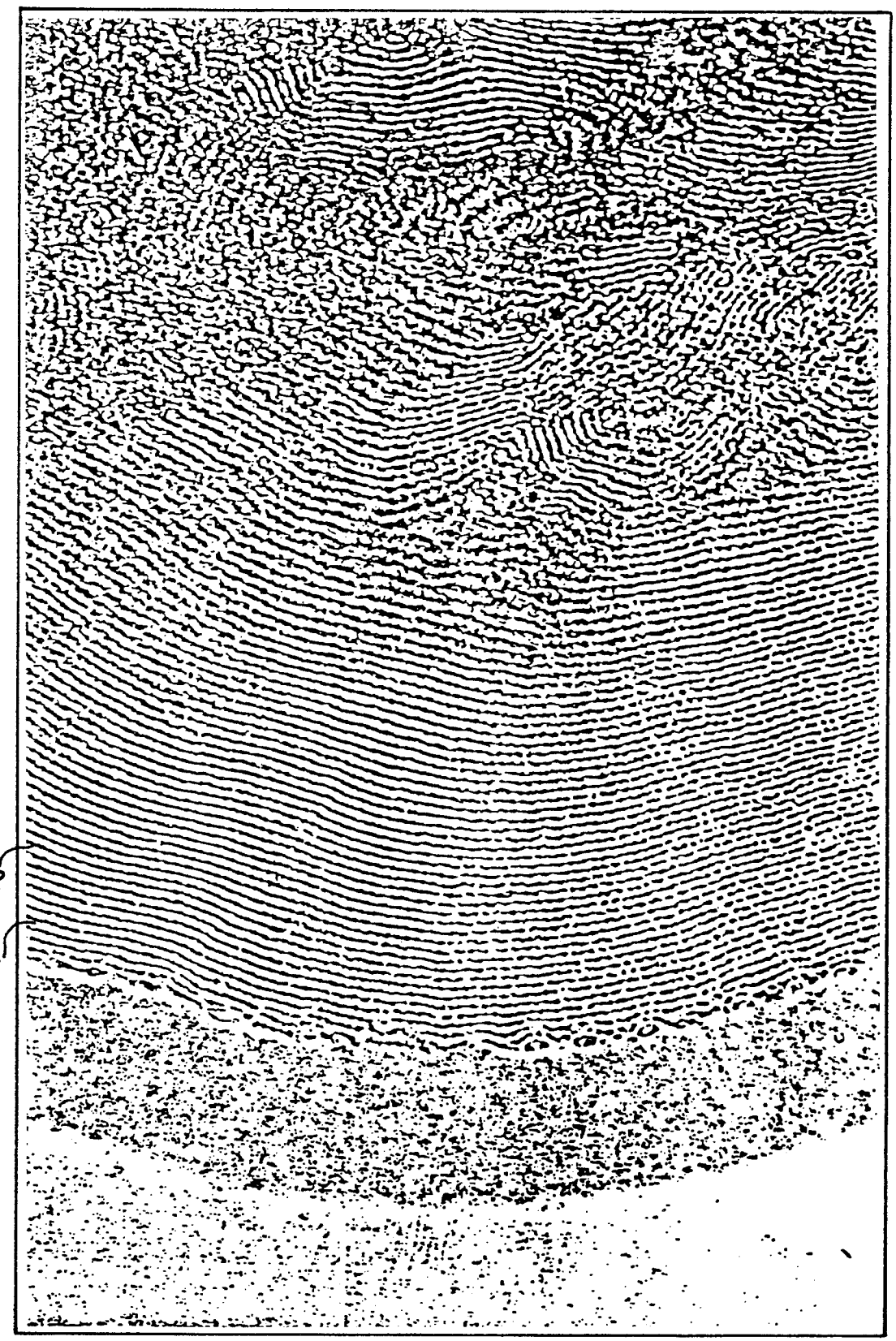

BLOCK COPOLYMER PROCESS

BACKGROUND OF THE INVENTION

1. Field of the Invention

This invention relates to an improved anionic dispersion polymerization process for the preparation of linear block copolymers containing A) blocks of polymerized styrene or alkyl-substituted styrene units, which are the end or terminal block of the polymer, and which alternate with B) blocks of polymerized conjugated diene units. The invention also relates to improved block copolymers of the foregoing type which have a highly ordered lamellar microstructure.

2. Information Disclosure Statement Including Description of Related Art

The following information is disclosed in accordance with the terms of 37 CFR 1.56, 1.97 and 1.98.

Processes for producing linear multiblock copolymers by anionic dispersion polymerization are known in the art. Thus, U.S. Pat. No. 3,770,712, issued Nov. 6, 1973 to Schwab, discloses this type of process used to produce diblock copolymers containing a polystyrene block and a second block which may be polyisoprene or polybutadiene; U.S. Pat. No. 4,871,414, issued Oct. 3, 1989, to Gunesin et al., teaches the use of the same type of process to produce block copolymers containing at least five blocks wherein blocks of a polymer of styrene or an alkyl-substituted styrene are the terminal blocks and alternate with blocks of a polymer of a conjugated diene; and U.S. Pat. No. 4,985,505, issued Jan. 15, 1991 to Gunesin et al. teaches the preparation of block copolymers of a styrenic compound and a conjugated diene by anionic dispersion polymerization utilizing propane or n-butane as a dispersion medium. The polymers of the latter two patents are described as having good or excellent physical properties such as elongation and impact strength, and as being suitable for blending with crystal polystyrene to improve its physical properties. Although the anionic dispersion polymerization processes disclosed in these patents can be operated at relatively high conversion rates to produce products having good mechanical properties, further improvements in conversion rates and product properties would be very beneficial.

It is also known in the art to utilize anionic solution polymerization to produce block copolymers comprising blocks of polymers of a vinylaromatic hydrocarbon, e.g., styrene, with blocks of a polymer of a conjugated diene, e.g., butadiene or isoprene. Thus, U.S. Reissue Pat. No. 27,145, issued Jun. 22, 1971 to Jones, and U.S. Pat. Nos. 4,835,220, issued May 30, 1989 and 4,891,410 issued Jan. 2, 1990, both to Bronstert et al., disclose the use of anionic solution polymerization to produce triblock copolymers wherein the terminal blocks are polymers of a vinylaromatic compound, e.g., styrene, and the central block is a polymer of a conjugated diene, e.g., butadiene. Bronstert et al. also teach that a mixture of a vinylaromatic compound and a conjugated diene may be added to a previously formed living polymer of vinylaromatic compound (A block), in which case the conjugated diene initially tends to be the monomer being predominantly polymerized, with most of the vinylaromatic compound in the mixture being polymerized after a major part of the conjugated diene has been polymerized to form a B block. This results in the formation of an A-B-A type of block copolymer in which the B block and second A block are separated by a transitional portion containing an increasing amount of polymerized vinylaromatic compound before evolving into the second A block. Anionic solution polymerization processes such as those described in these references, when compared with anionic dispersion polymerization processes, have the disadvantages that it may be difficult to obtain a sufficiently high molecular weight of the polymer due to the fact that solutions of higher molecular weight polymers have viscosities much higher than those of lower molecular weight polymers, making the former solutions much more difficult to treat and handle, and that considerably more energy is generally required to separate and purify a polymer in solution than one that is in the form of a dispersion.

None of the dispersion or solution polymerization processes disclosed in the foregoing patents includes the initial addition to the reactor zone of all the vinylaromatic compound polymerized to form the final block copolymer before any conjugated diene is added. This feature of the process covered herein, as more fully described hereinafter, results in higher conversion rates and improved mechanical properties of the polymer, as compared with processes wherein the vinylaromatic compound is added sequentially as is conventional in the art.

SUMMARY OF THE INVENTION

In accordance with this invention, an anionic dispersion polymerization process is provided for the preparation of linear block copolymers comprising an odd number of blocks including blocks of polymerized styrenic compound, viz., styrene or an alkyl-substituted styrene (A blocks), which are the end or terminal blocks of the polymer and alternate along the polymer chain with blocks of polymerized conjugated diene units (B blocks). In carrying out the process, the total amount of the styrenic compound to be utilized in forming the block copolymer is initially contacted under polymerization reaction conditions with an anionic initiator and a dispersant in an inert dispersion medium in which the polymer is insoluble. The reaction is continued until a predetermined amount of styrenic compound which is less than that initially charged polymerizes to form an initial living A block of polymerized styrenic compound of the desired molecular weight. An amount of conjugated diene is then added corresponding to the desired molecular weight of an elastomeric B block of polymerized diene appended to the initially formed A block. Due to the substantially greater tendency of the conjugated diene to polymerize than the styrenic compound, the formation of such B block proceeds by the polymerization of the added diene while the polymerization of the styrene or substituted styrene is substantially interrupted. After the added diene is substantially completely polymerized, the polymerization of styrenic compound spontaneously resumes to form a second A block appended to the B block. The process may be terminated at this point if the desired product is a triblock copolymer having an A-B-A structure. However, if a copolymer having a larger number of blocks is desired, the process is designed such that the second A block does not exhaust the supply of styrenic compound in the reactor and a second amount of conjugated diene is added resulting in the formation of a second B block appended to the second A block. After the amount of polymerizing diene forming the second B block is exhausted, the polymerization of styrenic compound again resumes spontaneously and if the process is designed so that the styrenic compound is exhausted at this stage, a five-block copolymer will result having the structure A-B-A-B-A. However, the last two stages may be repeated as described to obtain polymers having a larger odd number of blocks with alternating A and B blocks and the terminal blocks being A blocks. The length of time allowed for the formation of each A block before the addition of diene to form the subsequent B block is determined by any of various means known in the art including the use of a predetermined profile of the rate of polymerization of the styrenic compound under similar conditions.

The foregoing process results in the formation of block copolymers having a unique lamellar structure which is not obtained from similar processes, e.g., those disclosed in previously cited U.S. Pat. Nos. 4,871,814 and 4,985,505, wherein the amounts of monomers forming the respective blocks, including the styrenic compound, are added sequentially with each amount of added monomer being substantially completely polymerized before the next amount is added. Moreover, this different structure often results, after orientation, in improved mechanical properties of the polymer, particularly elongation, at given levels of polymerized diene content and molecular weight.

BRIEF DESCRIPTION OF THE DRAWING

The drawing is a schematic representation of an electron micrograph of a cross-section of a polymer particle of this invention showing the lamellar structure of such particle.

DETAILED DESCRIPTION OF THE INVENTION

As stated, the feature of initiating the reaction in the presence of the entire amount of styrenic compound utilized in forming the final block copolymer is critical to the invention claimed herein. However, aside from this feature, the general process conditions suitable for carrying out the process of this invention are described in previously cited U.S. Pat. Nos. 3,770,712, 4,871,414, and 4,985,505, which are incorporated herein by reference in their entirety. These patents and others describe the dispersion or slurry polymerization of monomers such as styrene and the preparation of various block copolymers which can include monomers such as conjugated dienes.

The styrenic compound used to prepare the A block of the block copolymers of this invention are styrene or substituted styrenes including alkyl-substituted styrenes, particularly methyl-substituted styrenes such as para-methylstyrene, but not including styrenes with polar groups such as chloride substituents which cannot be used in anionic polymerization. One or more appropriate styrene monomers can be used. The B block comprising polymerized conjugated diene units can be formed from any anionically polymerizable conjugated diene, particularly butadiene, isoprene or dimethylbutadiene.

Suitable anionic initiators include monofunctional initiators such as butyl-lithium, sec-butyl-lithium and t-butyl-lithium, and similar difunctional and multifunctional initiators. The concentration of the initiator is generally from about $10^{-1}$ to $10^{-4}$ /100 g of monomer.

The reaction is conducted at a temperature, for example, of about 30° to 100° C. in an inert medium (also called a dispersion or slurry medium), which is a non-solvent for the polymer, e.g. a paraffinic or monoolefinic hydrocarbon having between about 3 and 7 carbon atoms. Aromatic hydrocarbons and polar solvents are not suitable. Examples of useful dispersion or slurry media are propane, n-butane, isobutane, n-pentane, isopentane, n-hexane, n-heptane, 2,2-dimethylbutane, butene, pentene, and petroleum ether. In the case of block copolymers containing over 25 wt. % of diene polymer (B) blocks, solubility of the polymer in the higher molecular weight solvents of the foregoing list may be higher than desirable for a dispersion polymerization process. Therefore, in the case of these polymers, it is preferred to use as dispersion medium any of those claimed in U.S. Pat. No. 4,985,505 previously described, viz., those containing a major proportion, preferably at least 80 wt. %, of propane, or n-butane, and, optionally, a minor proportion, preferably up to 20 wt. %, of another alkane containing 4–6 carbon atoms such as isobutane, n-pentane, isopentane, n-hexane, 2,2-dimethylbutane, or petroleum ether. A preferred dispersion medium in this category comprises 80–90 wt. % n-butane and 10–20 wt. % of n-pentane.

The reaction is generally conducted under pressure when a dispersion medium is used such as an alkane containing 3 or 4 carbon atoms which is highly volatile at the reaction temperature. The employment of such a highly volatile medium and pressure reaction conditions are advantageous in separating the polymer particles from the dispersion medium.

The polymeric dispersing agent which is used to maintain the polymer in suspension as it is formed is advantageously an A-B block copolymer containing blocks which are similar to or the same as the blocks in the copolymer being produced. A diblock polymer comprising styrene and butadiene blocks having a number average molecular weight of 140,000 and a styrene content of about 40% has been found to be suitable for the preparation of block copolymers containing at least 70 wt. % of polymerized styrenic compound. For the preparation of block copolymers containing under 70 wt. % of polymerized styrenic compound, i.e., at least 30 wt. % of polymerized diene, a suitable dispersant is a diblock copolymer comprising blocks of hydrogenated styrene-butadiene copolymer and hydrogenated styrene-isoprene copolymer with a polystyrene content of about 40 wt. % and a number average molecular weight of 140,000 (Shell-Vis 1702). The dispersing agent is generally present in amounts of about 0.1 to 5.0 wt. % of the monomers.

The linear block copolymers prepared in accordance with this invention have 3 or more (e.g., 3–10) alternating A blocks comprising polymerized styrene or substituted styrene and B blocks comprising polymerized conjugated diene units, in which the terminal blocks are A blocks. Thus, for example, copolymers containing three blocks have the structure A-B-A and those containing five blocks have the configuration A-B-A-B-A. Polymers containing a larger number of blocks will have successive B-A diblocks appended to the living end of the polymer.

The block copolymer will contain, for example, at least about 10 wt. % of A blocks made up of polymerized styrenic units and at least about 10 wt. % of B blocks made up of polymerized diene units. Polymers under this invention intended to produce non-rubbery polymers which can be formed into shaped articles, e.g., molded articles and films of high impact strength and clarity, may contain, for example, at least about 60 wt. %, preferably about 60 to 90 wt. %, of A blocks, and at least about 10 wt. %, preferably about 10 to 40 wt. %, of B blocks. On the other hand, polymers having somewhat rubbery properties, e.g., thermoplastic elastomer, can contain, for example, about 10 to 50 wt. %, preferably about 20 to 30 wt. % of A blocks and about 90 to 50 wt. %, preferably about 80 to 70 wt. % of B blocks.

Because the process used for polymerization is a slurry process, the high viscosity of solutions of high molecular weight polymers imposes no constraint on the molecular weight of the block copolymers. Since high molecular weight polymers have advantageous physical properties, the polymers of this invention are of high molecular weight but not so high as to adversely affect processability. Accordingly, number average molecular weights in the range of 80,000 to 200,000 are contemplated and suitable copolymers in the molecular weight range of 100,000 to 150,000 have been prepared. Although the block copolymers have high molecular weights, high polymer concentrations relative to the solvent dispersing medium in the range of 20 wt. % to 45 wt. % of polymer are readily achieved. Using solution polymerization techniques, it would not be possible to obtain such high molecular weights at the high polymer concentrations possible with the process of this invention because the solution viscosities would be too high.

As compared with anionic dispersion polymerization processes to produce block copolymers wherein the monomers are added sequentially to produce the separate blocks with the polymerization of each batch of monomer being completed before the next batch is added, the process of this invention results in higher conversion rates, e.g., on the order of 30% conversion/hr., and the production of polymer having a more uniform particle size as indicated by a lower particle size distribution, i.e. Dw/Dn, where Dw is weight average particle size and Dn is number average particle size determined by Zeisser counter measurements. Thus, particles having a diameter of about 3 to 4 microns and a particle size distribution of about 1.3 to 1.8 may be obtained by means of the claimed process.

In addition to the foregoing advantages, each particle produced by the process exhibits a highly ordered lamellar morphology as shown in the drawing, which is a schematic representation of an electron micrograph of the cross-section of such a particle. Referring to the drawing, the light lamellae 1 indicate the polymerized styrenic compound A blocks, while the dark lamellae 2 indicate the polymerized diene B blocks. The thickness of the individual lamellae generally range from about 150 to 300 angstroms, depending on the relative content of particular blocks which they identify.

The described lamellar morphology allows for further orientation of the lamellae which results in improved mechanical properties such as higher modulus, tensile strength, yield strength, and particularly elongation of shaped articles produced from the polymer at a constant diene polymer content and molecular weight.

Relatively non-rubbery, i.e., plastic-type, block copolymers having excellent clarity and gloss, good elongation and impact strength are achievable with this invention. These polymers are useful, for example, in the preparation of containers, such as clear cups, that can be coextruded with high impact polystyrene to achieve a glossy and clear surface, and they can be blended with polystyrene crystal to improve the physical properties of polystyrene. They exhibit better compatibility with polystyrene than many presently available materials used for this purpose. For example, the linear copolymer of this invention generally exhibits better compatibility with polystyrene than the branched radial block copolymers which are commercially available and those which are described in U.S. Pat. Nos. 3,639,517 and 4,091,053.

Thermoplastic elastomers can also be produced by means of the process of the invention which are rubbery at room temperature but can be molded or otherwise shaped at elevated temperatures similar to other thermoplastic polymers into, e.g., sporting goods, footwear and other molded articles.

The following example further illustrates the invention.

EXAMPLE

To a 5 gallon reactor were charged 3000 g of styrene, 10 l of hexane, and 75 g of dispersant which was a diblock copolymer of styrene and butadiene having a number average molecular weight of about 140,000 and containing 40 wt. % of polystyrene. The reactor was purged for 30 minutes by bubbling $N_2$ through its contents. Residual impurities were titrated away and the reaction initiated with 25 ml of 1.3M sec-butyllithium at 30° C. and 40 psig. The temperature was raised to 35° C. and the polymerization was continued at that temperature and 40 psig for 20 min. by which time 35% of the total styrene was converted into polymer.

At 25 minutes from initiation, 700 cc of purified butadiene were added to the reactor and the temperature was raised to 65° C., and the pressure to 80 psig. After all the butadiene was polymerized, a 2° jump in reactor temperature was observed and the polymerization of styrene was resumed. Again, using a known profile of the rate of styrene polymerization under these conditions, the polymerization was allowed to continue for 10 min. at 65° C. and 80 psig by which time 50% of the remaining styrene was polymerized.

At this time, 700 cc of additional butadiene were added and completely polymerized in 2.5 hours. Polymerization of the remaining styrene again resumed and was completed within 10 min. The reaction was terminated with methanol and a standard anti-oxidant package was added to stabilize the mix. The dispersed polymer was then collected and washed.

The total polymerization of all the monomer took 4 hours and 50 min., and the average polymerization rate was 19%/hr. This rate could be changed by varying the concentration of sec-butyllithium catalyst.

The product was a block copolymer having the structure A-B-A-B-A and contained 24 wt. % of polystyrene blocks and 76 wt. % of polybutadiene blocks. An electron micrograph of the cross-section of one of the polymer particles was obtained and is schematically represented in the drawing where the thickness of the light polystyrene block lamellae 1 is about 300 angstroms and that of the dark polybutadiene block lamellae 2 is about 200 angstroms.

The product was found to have the following properties: weight average molecular weight (Mw)—149,000; molecular weight distribution (Mw/Mn)—1.4; yield strength—33 MPa; tensile strength—128 MPa; elongation—330%; and modulus—5 MPa.

Although the present invention has been described with preferred embodiments, it is to be understood that modifications and variations can be made without departing from the spirit and scope of this invention, as those skilled in the art will readily understand. Such modifications and variations are considered to be within the purview and scope of the appended claims.

We claim:

1. An anionic dispersion polymerization process for the preparation of a linear block copolymer containing an odd number of blocks including A blocks of a polymerized styrenic compound which is styrene or an alkyl-substituted styrene, said A blocks being the end or terminal blocks of the polymer and alternating along the block copolymer chain with elastomeric B blocks of polymerized conjugated diene units, said process comprising initially contacting the total amount of styrenic compound to be utilized in forming the block copolymer under polymerization reaction conditions with an anionic initiator and a dispersant in an inert dispersion medium in which the block copolymer is insoluble, such that a predetermined amount of said styrenic compound which is less than that initially charged is polymerized to form a living A block of the desired molecular weight, adding an amount of conjugated diene corresponding to the desired molecular weight of a first elastomeric B block of polymerized diene appended to the initially formed A block, allowing the polymerization of said diene to proceed to completion while the polymerization of styrenic compound is interrupted due to the greater tendency of the diene to polymerize, allowing the polymerization of styrenic compound to continue either to completion to form a second and final A block, if a triblock copolymer having the structure A-B-A is desired, or again allowing a predetermined amount of styrenic compound which is less than the total amount of styrenic compound remaining to form a second A block, adding a second amount of said diene and allowing it to polymerize to form a second B block, either allowing the remainder of styrenic compound to polymerize, if a five-block copolymer having the structure A-B-A-B-A is desired, or repeating the last two steps until a block copolymer having the desired structure is obtained, and recovering said block copolymer.

2. The process of claim 1 wherein said styrenic compound is styrene and said diene is butadiene.

3. The process of claim 1 wherein said block copolymer contains at least about 10 wt. % of A blocks and at least about 10 wt. % of B blocks.

4. The process of claim 3 wherein said block copolymer contains at least about 60 wt. % of A blocks and at least about 10 wt. % of B blocks.

5. The process of claim 4 wherein said block copolymer contains about 60 to 90 wt. % of A blocks and about 10 to 40 wt. % of B blocks.

6. The process of claim 3 wherein said block copolymer contains about 10 to 50 wt. % of A blocks and about 90 to 50 wt. % of B blocks.

7. The process of claim 6 wherein said block copolymer contains about 20 to 30 wt. % of A blocks and about 80 to 70 wt. % of B blocks.

* * * * *